United States Patent [19]

Matson

[11] Patent Number: 4,821,451
[45] Date of Patent: Apr. 18, 1989

[54] SHELLFISH TRAP

[76] Inventor: Boris R. Matson, 2110 NE. First Ave., Boynton Beach, Fla. 33435

[21] Appl. No.: 80,909

[22] Filed: Aug. 3, 1987

[51] Int. Cl.⁴ .............................................. A01K 69/06
[52] U.S. Cl. ........................................ 43/102; 43/105
[58] Field of Search .................. 43/100, 102, 103, 105

[56] References Cited

U.S. PATENT DOCUMENTS

| | | | |
|---|---|---|---|
| 2,473,910 | 6/1949 | Ruiz | 43/105 |
| 2,489,856 | 11/1949 | Buford | 43/102 |
| 2,679,125 | 5/1954 | Howard | 43/102 |
| 4,134,226 | 1/1979 | Petrella | 43/102 |
| 4,445,295 | 5/1984 | Litrico | 43/102 |
| 4,530,182 | 7/1985 | Ponzo | 43/102 |
| 4,587,758 | 5/1986 | Ponzo | 43/102 |

Primary Examiner—Kurt Rowan
Attorney, Agent, or Firm—Harry W. Barron

[57] ABSTRACT

A crab trap for submersion in naturally occurring waters includes a flat reticulated member and a reticulated encaging member slidably mounted on a rod extending from the flat member. The encaging member also includes solid flotation means for maintaining the encaging member in spaced apart relationship with the lower flat member while entering and remaining in the water. The pressure of the water against the solid surface of the flotation member during the lifting of the crab trap overcomes the flotation forces and effects a tight engagement of the normally spaced apart flat and encaging members for trapping a crab. The amount of buoyancy of the flotation member is selected to cause the encaging member to have an overall density slightly less than the density of water, while the overall density of the entire crab trap is greater than the density of water.

8 Claims, 1 Drawing Sheet

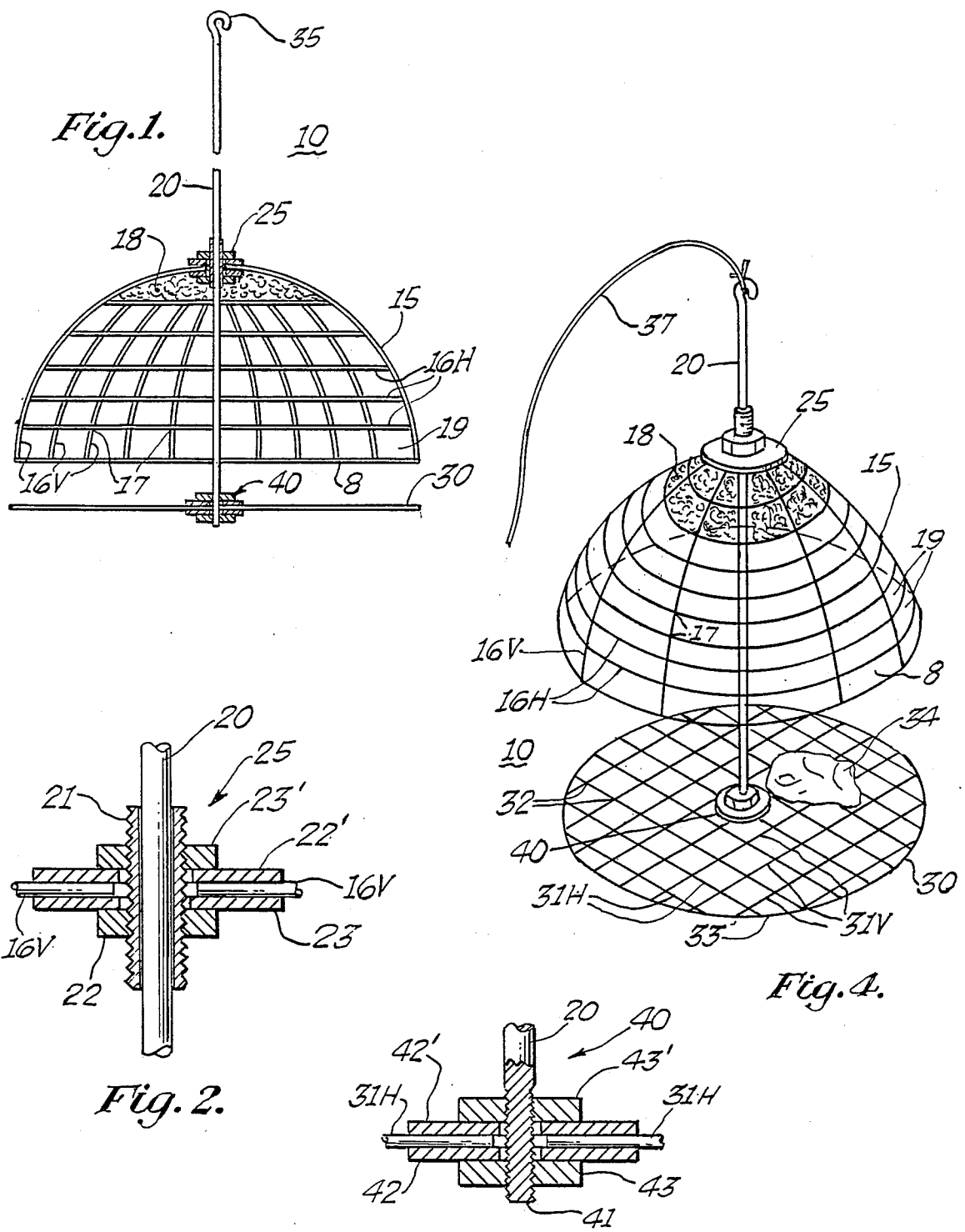

SHELLFISH TRAP

This invention relates to a device for harvesting shellfish, such as crabs, lobster or other similar marine creatures, in seas or fresh bodies of water forming the habitat of such creatures, and more particularly, to such a trap which is lightweight, easy to build and use and permits easy retrieval of the shellfish caught thereby.

In the past, shellfish, such as crabs, lobster and the like, have been harvested by using relatively heavy and complicated trap door trapping devices. These devices are typically used by manually lowering and raising them in about fifteen feet of water. A typical prior art crab trap, for example, has four trap doors, each of which is opened by the release of the tension on the rope used to lower the trap to the sea bottom. Each of the four trap doors has its own individual string or wire coupled from the main rope and the four strings can easily become tangled. This is particularly true when the trap is lowered in a moving current, such as when the tide is coming in or going out. When the individual strings get tangled, the doors either won't open, so the crabs can't get in the trap, or if opened, won't close, thereby allowing the crabs to escape.

The weight of the prior art devices make them difficult to use, particularly for children or the elderly. Further, the sea water environment reduces the life expectancy of the traditional traps, due to the harsh environment of the ocean. This is particularly true of the complex trap door structure, which may include springs and hinges, used to operate the trap doors. Hence, the devices must often be replaced or repaired. Finally, as the trap is lifted to the surface, the trap door strings may again become tangled and it becomes difficult to retrieve the captured creatures from the trap.

In accordance with one aspect of this invention, there is provided a shellfish trap for use on the bottom of a body of water comprising a flat member fabricated of reticulated material, and a post secured to the flat member and extending therefrom, the post having a stop thereon. In addition, the trap includes an encaging member, fabricated of reticulated material, slidably affixed to the post between the flat member and the stop, the encaging member including solid flotation material affixed thereto in an amount to cause the overall density of the encaging member and flotation material to be less than the density of water. Finally, the trap includes means, secured to the post, for inserting and retrieving the trap from the water bottom.

One preferred embodiment of the subject invention is hereafter described with specific reference being made to the following Figures, in which:

FIG. 1 is a side view of the crab trap;

FIG. 2 is an enlarged fragmentary view of a section of the crab trap;

FIG. 3 is a view similar to FIG. 2 showing another section of the crab trap; and FIG. 4 is a perspective view of the crab trap and illustrating the location of the crab bait in the trap.

Referring now to FIGS. 1 and 4, there is illustrated a crab trap 10, having a entrapment cage 15, a post or rod 20 and a bottom plate 30 as the essential elements thereof. Cage 15 is a hollow reticulated, generally hemispherical, inverted basket-like element which is loosely and slidably mounted on rod 20. Between the ends of rod 20 is securing structure 25, described below with reference to FIG. 2, for holding cage 15 and permitting it to slide on rod 20. Attached to the bottom of rod 20 is circular reticulated plate 30 functioning, in conjunction with cage 15, as a closure for confining a trapped crab and as a support for a crab bait 34, as shown in FIG. 4.

Plate 30 is secured to shaft 20 by a securing structure 40, described in more detail below with reference to FIG. 3. One end 35 of rod 20 is hooked shaped and has a rope 37 attached thereto for lowering and lifting the crab trap 10 into and out of the water, respectively. The rod 20 has a length about thirteen inches and the height of cage 15 is about seven inches. Rod 20 may be one fourth of an inch in diameter and plate 30 and the bottom of cage 15 may be sixteen inches in diameter.

Cage 15 includes a plurality of horizontal and vertically spaced curved wire elements 16V and 16H, secured at their contacting junctions 17, thereby forming openings 19 of approximately one inch by two inches. The horizontal wires 16H are circular in shape, with each successive horizontal wire 16H having an increasing diameter as it becomes further removed from the closed top of cap 15. The vertical wires 16V are generally a quarter circle arc of approximately eight inch radius. The wires 16V and 16H are secured to one another at junction 17 by any suitable means, for example, fusion welding where the wires 16V and 16H are formed of metal.

It is important that the wires 16V and 16H, or any other materials forming cage 15, be of a material having a density, or specific gravity, greater than water. Metal is a good example of such a material. The top ends of the curved vertical wires 16V are secured by securing structure 25, as hereinafter described with respect to FIG. 2. Cage 10 is generally hemispherical in shape and has an external convex surface and an internal concave surface. An open area 8, adapted to be closed by being juxtaposed to the plate 30, is not greater in size than plate 30, and preferably may be slightly smaller than plate 30, and faces the sea bottom. Mounted securely within the interior of cage 15, at the apex thereof, is a mass of solid material 18, selected to have a density less than that of the water environment of the crab trap 10. For example, Styrofoam (R) or other equivalent buoyant material, capable of functioning as a float, as described below in reference to the operation of the crab trap 10, may be used.

Cage 15 is slidably mounted on shaft 20 by structure 25. Referring to FIG. 2, structure 25 includes an externally threaded and internally smooth sleeve or hollow tube 21 for slidably receiving shaft 20. The internal dimension of sleeve 21 is selected to be slightly greater than the diameter of rod 20 to permit low friction sliding. The ends of the vertically curved wires 16V are secured together by nut and washer pairs 22, 23 and washers 22', 23', as follows. Nut 22 is initially threaded on sleeve 21 at one end thereof and washer 23 having an aperture of a diameter greater than the external diameter of sleeve 21 is then mounted on nut 22. Next, the ends of the curved wires 16V are then positioned on the top surface of washer 23. Finally, washer 23' is placed on top of the ends of the wires 16V and this assembly is secured together by tightening nut 22' onto sleeve 21.

The reticulated water pervious plate 30, formed of wires 31V, 31H and 33, is fixedly secured to the lower end of rod 20 by securing structure 40, as illustrated in detail in FIG. 3. Circular wire 33 forms the outer edge of plate 30 and straight wires 31V and 31H are affixed to wire 33 and to one another at cross points 32 by fission welding, for example. The size of plate 30 should be slightly larger than the open end 8 of cage 15.

Referring to FIG. 3, structure 40 is substantially identical to structure 25, differing only in the omission of sleeve 21. The center wires 31V and 31H of reticulated plate 30 are assembled by washers, 42, 42' and nuts 43, 43' being secured over the threaded end 41 of rod 20, similarly to the affixation of wires 16V of cage 15, as described above with reference to securing structure 25 in FIG. 2. Constructed in the manner just described, cage 15 slide along rod 20 between a closed position in which cage 15 is juxtaposed to plate 30 and an open position in which securing structure 25 is juxtaposed against hook stop 35.

Although FIGS. 1-4 show cage 15 and plate 30 having a hemispherical and circular shape respectively and being formed of wires, it is readily apparent that variations of this structure lie within the reach and capabilities of those skilled in the art without departing from the scope and spirit of the invention. For example, cage 15 and plate 30 may be of various shapes, e.g. square or other polygonal shapes, and cage 15 and plate 30 may be foramenous metal plates having a sufficient number of openings for functioning similarly to the reticulated cage 15 and plate 30, as herein described. Further, the materials selected may be made resistant to the corroding effects of salt water by selecting all parts to be galvanized or stainless steel, or weighted injection molded plastic.

The important structural feature to bear in mind is that the amount of flotation material 18 must be sufficient to render the overall density of cage 15 slightly less than the density of water, whereas the density of the entire crab trap 10 must be greater than the density of water, so that the crab trap 10 sinks towards the bottom of the sea. The importance of this feature will become apparent after the following discussion of the use and operation of crab trap 10.

Prior to submersion of crab trap 10 in water, the fisherman secures bait 34 on the internal surface of plate 30, as shown in FIG. 4, and then allows cage 15 to fall by gravitational forces into the closed relationship with respect to plate 30. Thereafter, the fisherman, using rope 37 lowers crab trap 10 into the water until it hits the bottom. Because the overall density of crab trap 10 is greater than the density of the water, crab trap 10 falls freely towards the bottom. During the fall, the open spaces between the wires 16 and 31 permit the water to flow through crab trap 10 without significant opposing forces. However, the solid portion where flotation material 18 is affixed to cage 15 has a pressure applied thereagainst due to the relative movement of crap trap 10 with respect to the water. This pressure against solid material 18 forces cage 15 towards hook 35, which also functions as a stop to limit the distance of slidable movement of cage 15. When crab trap 10 reaches the bottom, flotation material 18 maintains cage 15 in the upward position towards the surface.

The fisherman, after several minutes, or upon visually detecting a crab or other shellfish creature on the internal surface of the plate 30, quickly raises rope 37 for lifting crab trap 10 out of the water. This action of raising the rope 37 causes rod 20 and plate 30 to move upward. However, cage 15 tends to remain stationary for two reasons. First, rod 15 slides through securing structure 20 and inertia tends to keep cage 15 in place. Second, to the extent cage 15 begins to move, pressure is created against solid material 18 in a direction opposite to the direction of movement. Both of these factors overcome the buoyancy of flotation material 18, which is selected to maintain cage 15 only slightly more buoyant than neutral. After about six inches of movement of rope 37, plate 30 becomes juxtaposed against the bottom of cage 15, thereby capturing the crab. Thereafter, cage 15 is moved upward at the same rate as the remainder of crab trap 10. Trap 10 must be lifted with sufficient velocity so that the water pressure against the outer surface of the material 18 overcome the buoyancy forces of flotation material 18 and maintains cage 15 in tight engagement with the plate 30 during the remaining porting of the lifting of crab trap 10 from the water. When crab trap is removed from the water, gravity maintains cage 15 against plate 30, keeping the crab trapped. To remove the trapped crap, the fisherman merely slides cage 15 upward on rod 20.

What is claimed is:

1. A trap for submersion in waters containing shellfish comprising:
   an elongated shaft;
   a first and a second member, each having means for mounting that member on said shaft, said members being shaped for forming an enclosure having a hollow chamber for confining and entrapping a shellfish therein;
   at least one of said first and second members permitting the passage of water therethrough;
   at least one of said mounting means being so constructed for permitting movement of one of said members on said shaft relative to the other of said members;
   at least one of said members including flotation means for maintaining said members in spaced apart relationship while the members are submerged in the water prior to confining or entrapping a shellfish; and
   said flotation means being shaped to effect movement of said member including said flotation means into engagement with said other member for forming said hollow chamber during upward movement of said trap;
   wherein said members are formed of a material having a specific gravity greater than the water and said flotation means includes a material having a specific gravity less than water;
   wherein said one member including said flotation means is positioned above said other member and said flotation means is confined within said on member;
   wherein other member is constructed for being positioned on an ocean bed;
   wherein said member including said flotation means is hemispherically shaped with an open end and an apex;
   wherein said other member is flat; and
   wherein said open end faces said other member, whereby the other member serves as a closure for said open end; and
   wherein said flotation means is confined in the apex area of said hemispherically-shaped member.

2. A device as set forth in claim 1 wherein said upper member including flotation means is slidably mounted on said shaft and said other member is fixedly secured to said shaft.

3. A device as set forth in claim 1 wherein said flotation means is a foam material.

4. A device as set forth in claim 1 wherein said means for permitting movement of one of said members includes a sleeve and said shaft is slidably mounted in said sleeve.

5. A device as set forth in claim 1 wherein said members permitting the passage of water therethrough is reticulated.

6. A device as set forth in claim 5:
wherein said reticulated member includes a plurality of spaced vertical and horizontal wires; and
wherein said mounting means for permitting relative movement of one of said members includes means for fixedly securing the ends of said vertical wires.

7. A device as set forth in claim 1 wherein said shaft includes means for limiting the distance of movement of said movable member.

8. A trap for entrapping crabs comprising:
a reticulated plate member;
a vertical shaft;
means for fixedly securing one end of said shaft to said plate member;
a hollow cage member having an open end and an apex, said open end facing said plate member, said cage member formed of a material having a specific gravity greater than water;
means mounting said cage member on said shaft for relative movement on said shaft;
said cage member including solid float means mounted in the apex of said cage member, said float means having a specific gravity less than that of water;
the quantity of said float means being so selected to cause the density of said movable member to be less than water and the density of said entire trap to be greater than water, whereby said movable member and said spaced apart member are maintained in spaced apart relationship during submersion in the water;
the quantity of said float means further being selected to permit the pressure forces thereagainst to counteract the buoyancy thereof during retrieval of said trap, whereby said movable member and said plate member become engaged; and
the other end of said shaft including manually operable means for retrieving said trap and effecting sudden movement of said plate member into engagement with said movable member for entrapping a crab within the hollow cage member.

* * * * *